United States Patent [19]
Takasugi et al.

[11] Patent Number: 4,621,008
[45] Date of Patent: Nov. 4, 1986

[54] MAGNETIC RECORDING MEDIUM

[75] Inventors: Yasufumi Takasugi, Saku; Osamu Kohmoto, Ichikawa; Hiroshi Sugihara, Saku; Masaharu Nishimatsu, Komoro, all of Japan

[73] Assignee: TDK Corporation, Tokyo, Japan

[21] Appl. No.: 662,051

[22] Filed: Oct. 18, 1984

[30] Foreign Application Priority Data

Oct. 18, 1983 [JP] Japan ................. 58-195756
Oct. 20, 1983 [JP] Japan ................. 58-196722

[51] Int. Cl.$^4$ ............................... G11B 5/72
[52] U.S. Cl. ................... 428/216; 360/134; 360/135; 360/136; 204/192.2; 204/192.22; 427/128; 427/131; 427/132; 428/336; 428/694; 428/695; 428/900
[58] Field of Search ............... 360/134–136; 204/192 M, 192 D, 192 C; 427/128, 131, 132; 428/694, 900, 695, 704, 457, 336, 216

[56] References Cited

U.S. PATENT DOCUMENTS 4,232,072 11/1980 Pardee ..................... 428/65
4,305,994 12/1981 Murase .................... 428/704
4,425,404 1/1984 Suzuki .................... 428/695
4,537,832 8/1985 Kohmoto .................. 428/216

FOREIGN PATENT DOCUMENTS 123922  9/1979 Japan ..................... 427/131
55-93533 7/1980 Japan .
57-39449 8/1982 Japan .
58-146027 8/1983 Japan .
1160434 8/1969 United Kingdom .......... 427/131

OTHER PUBLICATIONS

Journal of Applied Physics, 36, No. 3, pp. 972–974 (1965).
The Fourth International Conference on Video and Data Recording IERE Conference Proceedings No. 54.

Primary Examiner—Ellis P. Robinson
Attorney, Agent, or Firm—Oblon, Fisher, Spivak, McClelland & Maier

[57] ABSTRACT

A magnetic recording medium for use in video and other applications is presented which comprises a substrate, a continuous thin magnetic layer of cobalt and at least one selected from nickel, chromium, and oxygen, preferably obliquely evaporated on the substrate, and a topcoat formed over the magnetic layer and made of a phosphate compound having the formula:

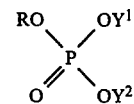

where
R is selected from the group consisting of substituted or unsubstituted alkyl radicals having 10 to 22 carbon atoms which may be saturated or have an unsaturated double bond in their backbone, and substituted or unsubstituted aryl, alkaryl, aralkyl and alkylarylalkyl radicals having 6 to 20 carbon atoms, and $Y^1$ and $Y^2$ may be the same or different and selected from the group consisting of hydrogen atom, cations, and substituted or unsubstituted alkyl and aryl radicals, the alkyl radicals being saturated or having an unsaturated double bond in their backbone, and $Y^1$ and $Y^2$ may together represent a divalent cation.

11 Claims, 1 Drawing Figure

MAGNETIC RECORDING MEDIUM

BACKGROUND OF THE INVENTION

This invention relates to magnetic recording media, and more particularly, to an improvement in the topcoat on magnetic recording media having a magnetic layer in the form of a continuous thin film.

Among magnetic recording media for use in video, audio and other applications, active research and development works have been mede on magnetic recording media, usually magnetic tapes having a magnetic layer in the form of a continuous thin film because of the compactness of a roll of tape.

The preferred magnetic layers for such continuous film type media are deposited films of Co, Co—Ni, Co—0, Co—Ni—O and similar systems formed by the so-called oblique incidence evaporation process in which cobalt and optional elements are evaporated in vacuum and directed at a given angle with respect to the normal to the substrate because such evaporated films exhibit superior characteristics. The deposited magnetic layers, however, have many disadvantages including high dynamic friction, low film strength, rough head contact, and low runnability (that is, the durability of tape which travels in frictional contact with rigid members in a video machine), resulting in reduced output after repeated travels. In the case of video application, the deposited magnetic layers exhibit a short life time when operated in the still mode (to be simply referred to as "still life", hereinafter). In addition, there occur many dropouts such layers.

Under these circumstances, a variety of topcoats have heretofore been proposed which cover obliquely evaporated magnetic layers. For example, Japanese Patent Application Kokai Nos. 53-88704 and 55-93533 disclose such topcoats formed from straight chain saturated fatty acids and esters thereof by eveporation and coating techniques. These prior art topcoats, however, are yet insufficient with respect to some of the above requirements, for example, runnability, still life, and dropout.

SUMMARY OF THE INVENTION

It is, therefore, an object of the present invention to provide a magnetic recording medium having a continuous thin magnetic layer covered with a novel topcoat which has improved characteristics including low dynamic friction, high strength and lubricity, smooth head contact, increased runnability, prolonged still life, and minimized dropouts.

According to the present invention, there is provided a magnetic recording medium comprising a substrate, a continuous thin magnetic layer on the substrate, and a topcoat formed over the magnetic layer, characterized in that the topcoat consists of a compound having the formula:

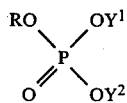

R is selected from the group consisting of substituted or unsubstituted alkyl radicals having 10 to 22 carbon atoms which may be saturated or have an unsaturated double bond in their backbone, and substituted or unsubstituted aryl, alkaryl, aralkyl and alkylarylalkyl radicals having 6 to 20 carbon atoms, and $Y^1$ and $Y^2$ may be the same or different and selected from the group consisting of hydrogen atom, cations, and substituted or unsubstituted alkyl and aryl radicals, the alkyl radicals being saturated or having an unsaturated double bond in their backbone, and $Y^1$ and $Y^2$ may together represent a divalent cation, with the proviso that R does not stand for an unsubstituted straight-chain saturated alkyl radical when $Y^1$ and $Y^2$ are independently hydrogen atom or cation, and that all R and $Y^1$ and/or $Y^2$ do not stand for an unsubstituted straight-chain saturated alkyl radical when $Y^1$ and/or $Y^2$ is an alkyl radical.

CROSS REFERENCE TO RELATED APPLICATION

The inventors have proposed in U.S. Patent Application Ser. No. 563,502 U.S. Pat. No. 4,537,832 to use as the topcoat the compounds having the above formula wherein R is a straight chain alkyl. The compounds of the above formula as defined herein are substantially equal in effect to the compounds of the previous application.

BRIEF DESCRIPTION OF THE DRAWING

The above and other objects, features, and advantages of the present invention will be more fully understood by reading the following description when taken in conjunction with the accompanying drawing, in which.

DETAILED DESCRIPTION OF THE INVENTION

Figure 1:
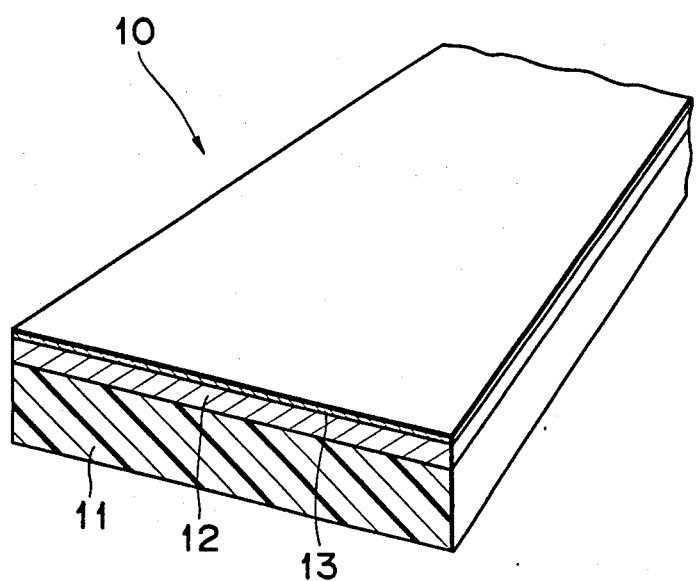
FIG. 1 is a partially cut-away, perspective view of the magnetic recording medium of the present invention.

Referring to FIG. 1, there is illustrated a magnetic recording medium generally designated at 10 according to the present invention. The magnetic recording medium 10 includes a substrate 11, a magnetic layer 12 formed thereon, and a topcoat 13. These elements will be described in more detail hereinafter.

The magnetic recording medium of the present invention has a magnetic layer on a substrate. The magnetic layer is of continuous thin film type coextending over the substrate and is generally composed solely of or based on cobalt or nickel. In the preferred embodiment of the present invention, the magnetic layer may contain cobalt (Co) as an essential base. It may preferably consist essentially of cobalt; cobalt and nickel; cobalt and oxygen; or cobalt, nickel, and oxygen. That is, the magnetic layer may consist essentially of cobalt alone or a mixture of cobalt with nickel and/or oxygen.

Where the layer consists essentially of cobalt and nickel, the weight ratio of Co/Ni may preferably be at least about 1.5.

The magnetic layer may further contain oxygen in addition to cobalt or cobalt and nickel. The presence of oxygen contributes to further improvements in electromagnetic characteristics and runnability. In this case, the atomic ratio of O/Co (when nickel free) or O/(Co+Ni) is preferably not more than about 0.45, and more preferably from about 0.15 to 0.4.

Better results are obtained when the magnetic layer contains chromium in addition to cobalt; cobalt and nickel; cobalt and oxygen; or cobalt, nickel, and oxygen. The presence of chromium contributes to further improvements in electromagnetic characteristics, output level, signal-to-noise (S/N) ratio, and film strength. In this case, the weight ratio of Cr/Co (when nickel free) or Cr/(Co+Ni) is preferably in the range of about 0.001 to 0.1, and more preferably about 0.005 to 0.05.

The magnetic layer may further contain trace elements, particularly transition metal elements, for example, Fe, Mn, V, Zr, Nb, Ta, Mo, W, Ti, Cu, Zn, etc.

The magnetic layer preferably consists of a coalescence of particles of columnar structure oriented oblique to the normal to the substrate because of enhanced electromagnetic characteristics. More specifically, particles of columnar structure are preferably oriented at an angle of about 20 to 60 degrees with respect to the normal to the major surface of the substrate. Each columnar particle generally extends throughout the thickness of the magnetic layer and has a diameter of the order of 50 to 500 angstroms. Cobalt and optional metals such as nickel and chromium form the columnar structure particles themselves while oxygen, when added, is generally present on the surface of each columnar structure particle essentially in the form of oxides. The magnetic layer generally has a thickness of about 0.05 to 0.5 μm.

The magnetic layer may be formed on the substrate either directly or via an undercoat layer. Further, the magnetic layer is generally formed as a single layer, but in some cases, it may be made up from a plurality of laminated sub-layers with or without an intermediate layer interposed therebetween.

The magnetic layer is generally formed by the so-called oblique incidence evaporation process. The oblique incidence evaporation process may be any of well-known techniques preferably using an electron beam gun while the minimum incident angle with respect to the normal to the substrate is preferably 30 degrees. Evaporation conditions and post-treatments are well known in the art and any suitable ones may be selected therefrom. One effective post-treatment is a treatment for incorporating oxygen into the magnetic layer, which is also well known in the art. For further information about this evaporation process, reference should be made to D. E. Speliotis et al., "Hard magnetic films of iron, cobalt and nickel", *J. Appl. Phys.*, 36, 3,972 (1965) and Y. Maezawa et al., "Metal thin film video tape by vacuum deposition", IERE Conference Proceedings 54 (The Fourth International Conference on Video and Data Recording, The University of Southampton, Hampshire, England, 20-23 April 1982), pp. 1-9.

On the magnetic layer is formed a topcoat consisting of a phosphate compound having the formula:

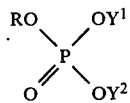

where R, $Y^1$, and $Y^2$ are as defined above.

In the above formula, R represents an alkyl radical having 10 to 22 carbon atoms. If the alkyl radicals of R contain less than 10 carbon atoms, the resulting top coat and hence, magnetic recording medium exhibits increased dynamic friction as well as reduced runnability and still life, and increased dropouts all outside the critical level. On the other hand, if the alkyl radicals of R contain more than 22 carbon atoms, dropouts increase beyond the critical level.

The $C_{10-20}$ alkyl radicals of R may be saturated or have an unsaturated double bond in their backbone. In the latter case, the number of double bonds is not particularly limited although one to four double bonds are preferred.

Whether they are saturated or unsaturated, the alkyl radicals of R have a chain structure and may optionally contain a five- or six-membered, usually saturated, ring at an intermediate or terminal position on the chain.

Futher, the alkyl radicals of R may be of a straight chain or branched. In the case of branched ones, such branches may preferably be present at that end of the backbone of R opposite to its bonding site, and most preferably, branched alkyl radicals are straight chain alkyls terminated with dimethyl, diethyl, dipropyl and other branching radicals.

The alkyl radicals of R may be substituted or unsubstituted. In the former case, the number of substituents is not particularly limited. Preferred substituents are halogens such as chlorine, bromine, fluorine, etc., alkoxy radicals, aryloxy radicals such as phenoxy radical, etc., alkyl carbonyl radicals, aryl carbonyl radicals, alkyl carbonyloxy radicals, aryl carbonyloxy radicals, alkoxy carbonyl radicals, aryloxy carbonyl radicals, acyl amino, carbamoyl, sulfonamide, sulfamoyl radicals and the like or a combination of two or more same or different radicals.

These substituted alkyl radicals are within the scope of the present invention as long as the total number of carbon atoms including the alkyl moiety of the substituent as well as the aryl moiety, as the case may be, is within the above-specified range.

In the above formula, R may further represent a substituted or unsubstituted aryl, alkaryl, aralkyl or alkylarylalkyl radical having 6 to 20 carbon atoms.

If these radicals contain less than 6 carbon atoms, the resulting topcoat and hence, magnetic recording medium exhibits increased dynamic friction as well as reduced runnability and still life, and increased dropouts all outside the critical level. On the other hand, if the radicals contain more than 20 carbon atoms, dropouts increase beyond the critical level.

Better results including lower dynamic friction, improved runnability, and less dropouts are expectable when R is selected from alkaryl, aralkyl and alkylarylalkyl radicals having 7 to 20 carbon atoms.

Differently stated, R radicals having 6 to 20 carbon atoms are aryl radicals or radicals having aryl and alkyl units. The aryl radical or aryl unit is preferably phenyl. The alkyl unit may be attached to the aryl unit at its bonding site and/or opposite site. The alkyl units themselves may be linear or branched.

The aryl, alkaryl, aralkyl, and alkylarylalkyl radicals of R may be substituted or unsubstituted. In the former case, the number of substituents may be equal to one or more. The alkaryl, aralkyl, and alkylarylalkyl radicals may be substituted at either alkyl or aryl units thereof.

The particularly preferred substituents include halogens such as chlorine, bromine, fluorine, etc., alkyl or aryl radicals, typically phenyl, attached to the backbone of R directly or via an appropriate linkage, or a combination of any two or more foregoing members. Examples of the appropriate linkages used herein include oxy, carbonyl, oxycarbonyl, carbonyloxy, amide, carbamoyl, sulfonamide, sulfamoyl radicals, etc. These substituted radicals are within the scope of the present invention as long as the total number of carbon atoms including the alkyl or aryl of the substituent is within the above-specified range.

$Y^1$ and $Y^2$ may be the same or different radicals and are independently selected from the group consisting of hydrogen atom, cations, and substituted or unsubstituted alkyl and aryl radicals. When $Y^1$ and $Y^2$ are hydrogen atoms or cations, the compunds of the formula are phosphoric acid monoesters.

The cations used herein are generally monovalent cations. However, when $Y^1$ and $Y^2$ are both cations, $Y^1$ and $Y^2$ may together represent a divalent cation.

The monovalent cations include (1) alkali metal ions such as $Li^+$, $Na^+$, and $K^+$; and (2) onium ions including ammonium ion ($NH_4^+$). Examples of the onium ions are primary to quaternary ammonium ions, primary to quaternary phosphonium ions, and primary to tertiary sulfonium ions, which all may have an alkyl radical such as methyl, ethyl, n-butyl, isoamyl, n-dodecyl, n-octadecyl, etc. or an aryl radical such as phenyl, tolyl, naphthyl, etc.; the alkyl and aryl radicals being optionally substituted with a cyano, alkyl, aryl, alkoxy, aryloxy, alkoxycarbonyl, aryloxycarbonyl, acyl, acylamino, carbamoyl, alkylsulfonylamino, sulfamoyl, sulfonyl radical or the like. Also included are cyclic, secondary, tertiary and quaternary, N-hydrogen, N-alkyl and N,N-dialkyl ammonium ions which may have a 5- or 6-membered ring such as pyridine, imidazole, pyrrole, 2-pyrroline, pyrrolidine, piperidine, pyrazole, pyrazoline, imidazoline, etc.

When $Y^1$ and $Y^2$ respectively represent monovalent cations, they may be the same or different.

Examples of the divalent cations are $Mg^{++}$, $Ca^{++}$, $Sn^{++}$, $Ba^{++}$, etc., and bisammonium and bisphosphonium ions. Also included are divalent ammonium cations having the general o formula: $B-[N^+(R')_3]_2$ where B represents a hydrocarbon residue, preferably an alkylene radical such as methylene and ethylene, and R' represents hydrogen or a substituted or unsubstituted alkyl or aryl radical.

The compounds represented by the above formula may be phosphoric acid diesters and triesters in addition to phosphoric acid monoesters having hydrogen or cations. In the case of di- and tri-esters, $Y^1$ and/or $Y^2$ may be a substituted or unsubstituted alkyl or aryl radical. In the case of di- and tri-esters, the total number of carbon atoms included in R, $Y^1$ and/or $Y^2$ is preferably not more than 44. More dropouts occur when the total carbon atom number exceeds 44. It is to be noted that when $Y^1$ and/or $Y^2$ is a substituted ammonium cation, any carbon atom in the cation is not included in said total carbon atom number.

The alkyl radicals represented by R may be saturated or unsaturated, and linear or branched, and may also contain a ring structure. The aryl radicals represented by R may be unsubstituted or substituted with such substituents as previously mentioned for R or with alkyl or aryl although the preferred aryl radical is phenyl.

The definition of R, $Y^1$, and $Y^2$ is as mentioned above with the proviso that R does not stand for an unsubstituted straight-chain saturated alkyl radical when $Y^1$ and $Y^2$ are independently hydrogen atoms or cations, and that all R and $Y^1$ and/or $Y^2$ do not stand for an unsubstituted straight-chain saturated alkyl radical when $Y^1$ and/or $Y^2$ is an alkyl radical (resulting in a phosphoric dialkyl or trialkyl ester). This provision is made for the purpose of delimiting the present invention to exclude the range of overlapping the previous application.

The phosphate compounds of the above formula may be synthesized by any well-known process or they may be commercially available. The use of a mixture of two or more such compounds is also contemplated within the scope of the present invention.

Examples of the phosphate compounds represented by the above general formula are shown below for the purpose of illustration and not by way of limitation.

TABLE 1

| No. | R | $Y^1$ | $Y^2$ |
|---|---|---|---|
| P 101 | $C_6H_5CH_2$ | H | H |
| P 102 | $C_6H_5CH_2$ | $N^+H_4$ | $N^+H_4$ |
| P 103 | $C_6H_5CH_2$ | $C_6H_5$ | $C_6H_5$ |
| P 104 | $C_6H_5C_2H_4$ | H | H |
| P 105 | p-(n-$C_3H_7$)$C_6H_4CH_2$ | H | H |
| P 106 | p-(n-$C_4H_9$)$C_6H_4CH_2$ | H | H |
| P 107 | p-(i-$C_3H_7$)$C_6H_4CH_2$ | H | H |
| P 108 | p-(i-$C_5H_{11}$)$C_6H_4CH_2$ | H | H |
| P 109 | p-(n-$C_3H_7$)$C_6H_4CH_2$ | $N^+H_4$ | $N^+H_4$ |
| P 110 | p-(n-$C_4H_9$)$C_6H_4CH_2$ | $N^+H_4$ | $N^+H_4$ |
| P 111 | p-(i-$C_3H_7$)$C_6H_4CH_2$ | $N^+H_4$ | $N^+H_4$ |
| P 112 | p-(i-$C_5H_{11}$)$C_6H_4CH_2$ | $N^+H_4$ | $N^+H_4$ |
| P 113 | $C_6H_5CH_2$ | $N^+H_4$ | $N^+H_4$ |
| P 114 | $C_6H_5CH_2$ | $N^+(CH_3)_4$ | $N^+(CH_3)_4$ |
| P 115 | $C_6H_5CH_2$ | $N^+(C_2H_5)_4$ | $N^+(C_2H_5)_4$ |
| P 116 | $C_6H_5C_2H_4$ | $N^+(C_4H_9)_4$ | $N^+(C_4H_9)_4$ |
| P 117 | di-m-(t-$C_5H_{11}$)$C_6H_4$ | $N^+H_4$ | $N^+H_4$ |
| P 118 | di-m-(t-$C_5H_{11}$)$C_6H_4$ | H | H |
| P 119 | p-(n-$C_4H_9$)$C_6H_4CH_2$ | $N^+(CH_3)_4$ | $N^+(CH_3)_4$ |
| P 120 | p-$C_9H_{19}C_6H_4$ | $N^+(CH_3)_4$ | $N^+(CH_3)_4$ |
| P 121 | $C_6H_5CH_2$ | $C_6H_5CH_2$ | H |
| P 122 | $C_6H_5CH_2$ | $CH_3$ | $CH_3$ |

TABLE 2

| No. | R | $Y^1$ | $Y^2$ |
|---|---|---|---|
| P 201 | n-$C_{10}F_{21}$ | $N^+(CH_3)_4$ | $N^+(CH_3)_4$ |
| P 202 | n-$C_{10}F_{21}$ | $N^+(C_2H_5)_4$ | $N^+(C_2H_5)_4$ |
| P 203 | n-$C_{10}F_{21}$ | $N^+(C_2H_5)_4$ | $N^+(CH_3)_4$ |
| P 204 | n-$C_{10}H_{21}CH=CH$ | $N^+(CH_3)_4$ | $N^+(C_2H_5)_4$ |
| P 205 | n-$C_{10}H_{21}CH=CH$ | $N^+(C_2H_5)_4$ | $N^+(C_2H_5)_4$ |
| P 206 | i-$C_{10}H_{21}CH=CH$ | $N^+(C_4H_9)_4$ | $N^+(C_4H_9)_4$ |
| P 207 | n-$C_{12}H_{25}F$ | $N^+(C_2H_5)_4$ | $N^+(C_2H_5)_4$ |
| P 208 | i-$C_{10}F_{21}$ | $C_6H_5$ | $C_6H_5$ |
| P 209 | n-$C_{10}F_{21}$ | $CH_3$ | $CH_3$ |
| P 210 | n-$C_{10}H_{21}CH=CH$ | $CH_3$ | $CH_3$ |
| P 211 | n-$C_{10}H_{21}CH=CH$ | $C_6H_5$ | $C_6H_5$ |
| P 212 | n-$C_{10}F_{21}$ | H | H |
| P 213 | n-$C_{10}H_{21}CH=CH$ | H | H |
| P 214 | n-$C_{17}H_{35}CH=CHCH_2$ | $N^+(C_2H_5)_4$ | $N^+(C_2H_5)_4$ |
| P 215 | n-$C_{14}H_{29}CH=CH$ | $N^+(CH_3)_4$ | $N^+(CH_3)_4$ |
| P 216 | n-$C_{10}F_{21}$ | n-$C_{10}F_{21}$ | H |
| P 217 | n-$C_{10}F_{21}$ | n-$C_{10}F_{21}$ | n-$C_{10}F_{21}$ |
| P 218 | n-$C_{14}H_{29}CH=CH$ | $C_6H_5$ | $C_6H_5$ |
| P 219 | n-$C_{10}F_{21}$ | $C_2H_5$ | $C_2H_5$ |
| P 220 | n-$C_{14}H_{29}CH=CH$ | $C_2H_5$ | $C_2H_5$ |
| P 221 | n-$C_{18}H_{37}CH=CH$ | $C_6H_5$ | $C_6H_5$ |
| P 222 | n-$C_{10}H_{21}CH=CH-CH=CH$ | $N^+(C_2H_5)_4$ | $N^+(C_2H_5)_4$ |
| P 223 | n-$C_{10}H_{21}CH=CH-CH=CH$ | $C_2H_5$ | $C_2H_5$ |
| P 224 | n-$C_{16}H_{33}CH=CH$ | H | H |
| P 225 | n-$C_{16}H_{33}CH=CH$ | $N^+(C_2H_5)_4$ | $N^+(C_2H_5)_4$ |
| P 226 | i-$C_{16}H_{33}$ | $N^+(CH_3)_4$ | $N^+(CH_3)_4$ |
| P 227 | $C_2H_5OC_{14}H_{28}$ | $N^+(CH_3)_4$ | $N^+(CH_3)_4$ |
| P 228 | $CH_3OC_{15}H_{30}$ | $N^+H_4$ | $N^+H_4$ |
| P 229 | $C_6H_5OC_{10}H_{20}$ | H | H |

The topcoat consisting of such a phosphate ester or salt or a mixture thereof has a thickness ranging from a monomolecular layer to about 0.3 μm, preferably from about 0.005 to 0.1 μm.

The topcoat may preferably be formed by evaporation or sputtering process. Evaporation, typically by resistance heating, and sputtering, typically RF or DC sputtering may be carried out under well-known conditions, for example, at a melt temperature of 80° to 100° C. and an operating pressure of $1\times10^{-3}$ to $1\times10^{-1}$ Pa.

Film preparation processes other than the evaporation and sputtering processes may also be employed, but such other processes, for instance, gravure coating and calender coating are very difficult to form a uniform film as thin as defined above.

The substrate which can be used in the medium of the invention is not particularly limited although flexible substrates, particularly substrates of polyester, polyimide, polypropylene and other resins are preferred, commonly in the form of a length of tape. The thickness of the substrate varies over a wide range and is preferably in the range of about 5 to 20 μm. The back surface of the substrate which is opposite to the magnetic layer-bearing surface may preferably have a surface roughness or height irregularity of more than about 0.05 μm as expressed in RMS (root mean square) value.

The magnetic recording medium of the invention is useful in video, audio and other applications.

The magnetic recording medium of the invention, which is top coated with a phosphate having the above-defined formula, has a number of benefits, for example, critically reduced dynamic friction. In addition, film strength, lubricity, and head contact are greatly improved. As a result, the runnability and still life of the magnetic recording medium are substantially increased with minimized dropouts. It should be noted that these benefits are substantially equal to those resulting from similar compounds having straight-chain alkyl radicals.

DESCRIPTION OF THE PREFERRED EMBODIMENT

Examples of the present invention are presented below by way of illustration, but not by way of limitation.

EXAMPLE 1

Using a Co—Ni alloy having a Co/Ni weight ratio of 4/1 and a Co—Ni—Cr alloy having a Co/Ni/Cr weight ratio of 75/20/5, magnetic layers of 0.2 μm thick were formed on polyethylene terephthalate (PET) films of 10 μm thick by the oblique incidence evaporation process. The alloy-deposited films are designated Samples A0 and B0.

In the oblique incidence evaporation, the incident angle was 45 degrees with respect to the normal to the film or substrate, and the atmosphere contained argon and oxygen at partial pressures $P_{Ar}=2\times10^{-2}$ Pa and $P_{O_2}1\times10^{-2}$ Pa.

The resulting magnetic layers had the same compositions as the corresponding alloys except that oxygen was introduced therein, and both had an atomic ratio of O/(Co+Ni) of 0.2. The layers consisted of coalesced columnar structure particles grown at an angle of about 40° with respect to the normal to the major surface of the substrate, extending throughout the layer thickness, and having a minor diameter of 0.01 μm.

An Auger electron-spectroscopy analysis on the layer with ion milling showed that cobalt (Co) is less in proximity to the surface and oxygen (O) is chemically shifted and has a profile rich in proximity to the surface, indicating that oxygen is present bonded with the metals on the surface of columnar particles.

Next, topcoats of 0.01 μm thick as shown in Table 1 were formed on the magnetic layers of Samples A0 and B0 using various organic compounds as the evaporation source in an atmosphere having a partial pressure of argon $P_{Ar}=4\times10^{-3}$ Pa. The thus coated films are designated Samples A11 to A15 and B11 to B12.

The samples were tested for various properties. A commercially available VTR equipment was loaded with each sample in the form of video tape.

(1) Dynamic friction

A sample tape was driven over 50 passes in the VTR equipmemt. The dynamic friction coefficient μ of the sample was measured at a temperature of 40° C. and a relative humidity of 80% both at the initial and after 50 passes.

(2) Runnability

A sample tape was driven over 50 passes in the VTR equipment. The magnitude of signal output of the sample was measured at 4 MHz both at the initial and after 50 passes. The output reduction after 50 passes was expressed in dB.

(3) Still life

The VTR equipment loaded with a sample tape was operated in the still mode. The still life time (expressed in minute) of the sample tape was measured until the still picture disappeared.

(4) Dropout

A sample tape was played in the reproduction mode. Dropouts were counted as the number per minute of output reductions by 16 dB or more.

EXAMPLE 2

The procdure of Example 1 was repeated except that some of the phosphate compounds listed in Table 2 were used to form topcoats. The resulting films are designated Samples A21 to A25 and B21 to B22.

The test results are shown in Table 3.

The data in Table 3 reveals that the phosphate topcoat of the present invention exhibits improved performance over the prior art topcoats.

TABLE 3

| Sample | Magnetic layer | Topcoat | Dynamic friction coefficient μ Initial | After 50 passes | Output reduction (dB) | Still life (min) | Dropout (/min) | Remarks |
| --- | --- | --- | --- | --- | --- | --- | --- | --- |
| A 0 | CoNiO | — | 0.45 | 0.60 | −10 | <1 | 1000 | Control |
| A 21 | " | $C_6H_{13}OPO_3H_2$ | 0.30 | >1.0 | −8 | 10 | 560 | Comparison |
| A 22 | " | No. 226 | 0.19 | 0.19 | −1.3 | >60 | 210 | |
| A 23 | " | No. 215 | 0.19 | 0.20 | −1.3 | >60 | 210 | |
| A 24 | " | No. 212 | 0.19 | 0.19 | −1.3 | >60 | 220 | |
| A 25 | " | $C_{16}H_{33}OPO_3H_2$ | 0.15 | 0.15 | −1.2 | >60 | 120 | Comparison |
| B 0 | CoNiCrO | — | 0.45 | 0.60 | −10 | <1 | 1000 | Control |
| B 21 | " | $C_6H_{13}OPO_3H_2$ | 0.30 | >1.0 | −8 | 10 | 580 | Comparison |
| B 22 | " | No. 228 | 0.20 | 0.20 | −1.3 | >60 | 210 | |

What we claim is:

1. A magnetic recording medium comprising a substrate, a continuous thin magnetic layer on the substrate, and a topcoat formed over the magnetic layer, characterized in that the topcoat consists of a compound having the formula:

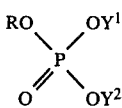

R is selected from the group consisting of substituted or unsubstituted alkyl radicals having 10 to 22 carbon atoms which may be saturated or have an unsaturated double bond in their backbone, and substituted or unsubstituted aryl, alkaryl, aralkyl and alkylarylalkyl radicals having 6 to 20 carbon atoms, and $Y^1$ and $Y^2$ may be the same or different and selected from the group consisting of hydrogen atom, cations, and substituted or unsubstituted alkyl and aryl radicals, the alkyl radicals being saturated or having an unsaturated double bond in their backbone, and $Y^1$ and $Y^2$ may together represent a divalent cation, with the proviso that R does not stand for an unsubstituted straight-chain saturated alkyl radical when $Y^1$ and $Y^2$ are independently hydrogen atom or cation, and that all R and $Y^1$ and/or $Y^2$ do not stand for an unsubstituted straight-chain saturated alkyl radical when $Y^1$ and/or $Y^2$ is an alkyl radical.

2. The magnetic recording medium according to claim 1 wherein the topcoat is deposited by evaporation or sputtering.

3. The magnetic recording medium according to claim 1 or 2 wherein the topcoat has a thickness of not more than 0.3 microns.

4. The magnetic recording medium according to claim 1 wherein the magnetic layer consists of cobalt and optionally, at least one member selected from the group consisting of nickel, chromium, and oxygen.

5. The magnetic recording medium acdording to claim 4 wherein the magnetic layer contains nickel and the weight ratio of cobalt to nickel is at least 1.5.

6. The magnetic recording medium according to claim 4 wherein the magnetic layer contains chromium and the weight ratio of chromium to cobalt ranges from 0.001 to 0.1.

7. The magnetic recording medium according to claim 5 wherein the magnetic layer further contains chromium and the weight ratio of chromium to the sum of cobalt and nickel ranges from 0.001 to 0.1.

8. The magnetic recording medium according to claim 4 wherein the magnetic layer contains oxygen and the atomic ratio of oxygen to cobalt is not more than 0.45.

9. The magnetic recording medium according to claim 5 wherein the magnetic layer further contains oxygen and the atomic ratio of oxygen to the sum of cobalt and nickel is not more than 0.45.

10. The magnetic recording medium according to claim 1 or 4 wherein the magnetic layer consists of a coalescence of particles of columnar structure oriented oblique to the normal to the substrate.

11. The magnetic recording medium according to claim 10 wherein the magnetic layer has a thickness of 0.05 to 0.5 μm.

* * * * *